(12) United States Patent
Zulawski (10) Patent No.: US 10,816,077 B2
(45) Date of Patent: Oct. 27, 2020

(54) DRIVE CLUTCH

(71) Applicant: Dennis Zulawski, Bemidji, MN (US)

(72) Inventor: Dennis Zulawski, Bemidji, MN (US)

( * ) Notice: Subject to any disclaimer, the term of this patent is extended or adjusted under 35 U.S.C. 154(b) by 240 days.

(21) Appl. No.: 16/032,792

(22) Filed: Jul. 11, 2018

(65) Prior Publication Data

US 2018/0320773 A1    Nov. 8, 2018

Related U.S. Application Data

(62) Division of application No. 14/803,864, filed on Jul. 20, 2015, now Pat. No. 10,054,211.

(51) Int. Cl.
*F16H 55/56* (2006.01)
*F16H 9/12* (2006.01)

(52) U.S. Cl.
CPC ............. *F16H 55/56* (2013.01); *F16H 9/12* (2013.01)

(58) Field of Classification Search
CPC .. F16H 55/563; F16H 61/66245; F16H 55/56; F16H 63/067; F16H 9/18
USPC .......................................................... 474/13
See application file for complete search history.

(56) References Cited

U.S. PATENT DOCUMENTS

| | | | | | |
|---|---|---|---|---|---|
| 1,416,745 A | * | 5/1922 | Peters | ..................... | B62M 9/06 474/25 |
| 2,253,634 A | * | 8/1941 | Mack | ............... | F16H 61/66245 474/13 |
| 2,709,372 A | * | 5/1955 | Melone | ................... | F16H 55/56 474/13 |
| 2,810,296 A | * | 10/1957 | Long | ..................... | F16H 61/662 474/28 |
| 2,928,286 A | * | 3/1960 | Davis | ............... | F16H 61/66245 474/13 |
| 2,932,217 A | * | 4/1960 | May | ........................ | F16H 9/16 474/28 |
| 3,088,327 A | * | 5/1963 | Swigart | ................... | F01P 7/046 474/13 |
| 3,226,994 A | * | 1/1966 | Harley | ............. | F16H 61/66245 474/15 |
| 3,269,201 A | * | 8/1966 | Looker | ................... | F16H 55/56 474/28 |
| 3,478,611 A | * | 11/1969 | Forest | ..................... | F16H 55/56 474/16 |

(Continued)

*Primary Examiner* — Henry Y Liu
(74) *Attorney, Agent, or Firm* — Westman, Champlin & Koehler, P.A.; Z. Peter Sawicki; Amanda M. Prose (57) ABSTRACT

A drive clutch having a compressible torque transfer mechanism configured to transfer torque from an engine or motor to a moveable sheave and configured to reduce wear on components of the drive clutch by eliminating sliding contact between surfaces to transfer torque and change the gear ratio. The torque transfer mechanism increases efficiency and reduces wear and may comprise a torque bellows, which is configured to transfer torque from the engine to the moveable sheave upon radial compression of the torque bellows. Sliding blocks and corresponding slide tracks are concentrically positioned between the moveable sheave and the shift plate and centrifugal force provides a force for linear movement for the sliding blocks, which results in movement of the moveable sheave and the cover, which can act to compress the torque bellows. This configuration reduces costs because precise machining is not needed and reduces premature wear and tear on the drive clutch.

4 Claims, 5 Drawing Sheets

(56) References Cited

U.S. PATENT DOCUMENTS

| | | | | |
|---|---|---|---|---|
| 3,492,884 A | * | 2/1970 | Beaudoin | F16H 55/563 474/13 |
| 3,625,079 A | * | 12/1971 | Hoff | B62M 25/00 474/12 |
| 3,653,283 A | * | 4/1972 | Betz | F16H 61/66263 477/46 |
| 3,659,470 A | * | 5/1972 | Beaudoin | F16H 55/563 474/13 |
| 3,680,403 A | * | 8/1972 | Schupan | F16H 61/66245 474/13 |
| 3,685,366 A | * | 8/1972 | Schupan | F16H 55/563 474/13 |
| 3,715,930 A | * | 2/1973 | Beliveau | F16H 61/6624 474/16 |
| 3,747,721 A | * | 7/1973 | Hoff | B62M 25/00 180/230 |
| 3,771,378 A | * | 11/1973 | Knobel | F16H 61/66245 474/14 |
| 3,824,867 A | * | 7/1974 | Brooks | F16H 55/563 474/13 |
| 3,850,050 A | * | 11/1974 | Lemmens | F16H 37/0846 475/208 |
| 3,863,514 A | * | 2/1975 | Jensen | B62M 11/04 474/13 |
| 4,020,711 A | * | 5/1977 | Woollard | B60K 25/02 474/13 |
| 4,028,953 A | * | 6/1977 | Lavallee | F16H 55/563 474/13 |
| 4,100,818 A | * | 7/1978 | Woollard | F16H 9/18 474/13 |
| 4,102,214 A | * | 7/1978 | Hoff | F16H 55/563 474/12 |
| 4,147,068 A | * | 4/1979 | Woollard | F16H 61/66245 474/13 |
| 4,179,946 A | * | 12/1979 | Kanstoroom | F16H 61/66245 474/13 |
| 4,345,664 A | * | 8/1982 | Anno | F16H 61/66245 180/230 |
| 4,348,197 A | * | 9/1982 | Oliver | F16H 61/6625 474/17 |
| 4,364,735 A | * | 12/1982 | Plamper | F16H 55/563 474/13 |
| 4,365,964 A | * | 12/1982 | Krome, Jr. | F16H 55/56 474/28 |
| 4,384,862 A | * | 5/1983 | Nakane | F16H 61/66245 192/105 B |
| 4,384,863 A | * | 5/1983 | Huff | F16H 61/6625 474/28 |
| 4,406,644 A | * | 9/1983 | Kinbara | F16H 61/66245 474/13 |
| 4,411,590 A | * | 10/1983 | Meredith | F16H 55/56 415/13 |
| 4,425,102 A | * | 1/1984 | Huff | F16H 61/6625 474/28 |
| 4,475,893 A | * | 10/1984 | Anno | F16H 61/66245 474/13 |
| 4,487,595 A | * | 12/1984 | Quick | F16H 55/563 29/892 |
| 4,496,335 A | * | 1/1985 | Quick | F16H 61/66245 188/298 |
| 4,515,575 A | * | 5/1985 | Kinbara | F16H 61/66227 474/11 |
| 4,634,405 A | * | 1/1987 | Quick | F16H 55/563 29/892.1 |
| 4,743,221 A | * | 5/1988 | Whiteman | F16H 55/563 474/13 |
| 4,943,264 A | * | 7/1990 | Whiteman, Jr. | F16H 55/563 474/13 |
| 5,013,283 A | * | 5/1991 | d'Herripon | F16H 9/125 474/12 |
| 5,073,147 A | * | 12/1991 | Takano | F16H 61/6624 474/28 |
| 5,108,347 A | * | 4/1992 | Gourdon | F16H 55/563 474/13 |
| 5,188,568 A | * | 2/1993 | Gourdon | F16H 55/563 474/13 |
| 5,242,330 A | * | 9/1993 | Tateno | F16H 61/66245 474/13 |
| 5,328,413 A | * | 7/1994 | Robert | F16H 55/563 474/13 |
| 5,348,517 A | * | 9/1994 | Dick | B60K 17/342 180/249 |
| 5,458,539 A | * | 10/1995 | Landry | F16H 55/563 474/13 |
| 5,514,040 A | * | 5/1996 | Robert | F16H 55/563 474/13 |
| 5,556,346 A | * | 9/1996 | Genzel | F16H 61/66272 474/18 |
| 6,086,492 A | * | 7/2000 | Nakano | F16H 55/563 474/14 |
| 6,443,864 B1 | * | 9/2002 | Friedmann | F16H 55/56 464/162 |
| 6,520,878 B1 | * | 2/2003 | Leclair | F16H 55/563 474/12 |
| 6,682,450 B2 | * | 1/2004 | Mukai | F16H 55/563 474/12 |
| 7,063,633 B2 | * | 6/2006 | Robert | F16H 55/563 474/13 |
| 7,172,523 B2 | * | 2/2007 | Borghi | F16H 55/563 192/3.54 |
| 7,204,771 B2 | * | 4/2007 | Gu | F16H 9/16 474/13 |
| 7,276,004 B2 | * | 10/2007 | Wu | F16H 55/563 474/13 |
| 7,341,533 B2 | * | 3/2008 | Wang | F16H 57/021 427/449 |
| 7,401,589 B2 | * | 7/2008 | Oishi | F01M 11/02 123/196 R |
| 7,637,828 B2 | * | 12/2009 | Murayama | F16H 55/563 474/12 |
| 7,731,613 B2 | * | 6/2010 | Ishida | F16H 63/067 474/19 |
| 7,803,074 B2 | * | 9/2010 | Ishida | F16G 5/166 474/13 |
| 7,892,121 B2 | * | 2/2011 | Oishi | F16H 63/067 474/11 |
| 7,988,573 B2 | * | 8/2011 | Shioiri | F16H 61/66272 474/18 |
| 8,092,325 B2 | * | 1/2012 | Nozawa | F16H 63/065 474/18 |
| 8,105,190 B2 | * | 1/2012 | Galletti | F16D 43/18 192/105 CD |
| 8,187,127 B2 | * | 5/2012 | Ishida | F16H 55/56 474/46 |
| 8,414,433 B2 | * | 4/2013 | Kadokawa | F16H 9/18 474/18 |
| 2001/0034280 A1 | * | 10/2001 | Kuga | F16H 9/18 474/8 |
| 2001/0039222 A1 | * | 11/2001 | Mukai | F16H 55/563 474/12 |
| 2001/0049312 A1 | * | 12/2001 | Warner | F16H 63/065 474/18 |
| 2004/0082415 A1 | * | 4/2004 | Borghi | F16H 55/563 474/13 |
| 2004/0171443 A1 | * | 9/2004 | Borghi | F16D 43/08 474/12 |
| 2004/0171449 A1 | * | 9/2004 | Oishi | B62M 7/02 474/144 |
| 2005/0014584 A1 | * | 1/2005 | Katou | F16H 55/56 474/28 |
| 2005/0090341 A1 | * | 4/2005 | Lohr | F16H 55/563 474/13 |
| 2006/0258492 A1 | * | 11/2006 | Wu | F16H 55/563 474/13 |

(56) References Cited

U.S. PATENT DOCUMENTS

| | | | |
|---|---|---|---|
| 2007/0105670 A1* | 5/2007 | Oishi | F16H 63/067 474/8 |
| 2007/0202975 A1* | 8/2007 | Ishida | F16H 9/18 474/8 |
| 2009/0191993 A1* | 7/2009 | Lin | F16H 55/56 474/13 |

* cited by examiner

DRIVE CLUTCH

CROSS-REFERENCE TO RELATED APPLICATION

The present application is a Divisional of U.S. patent application Ser. No. 14/803,864 filed Jul. 20, 2015, the content of which is hereby incorporated by reference in its entirety.

BACKGROUND OF THE INVENTION

Various relatively small motorized vehicles, such as snowmobiles, all-terrain vehicles (ATV's), tractors, motor scooters, go-carts and golf carts use an endless belt type continuously variable transmission (CVT). Variable transmissions include a variable-input drive/driving/primary pulley or clutch and an output driven/secondary pulley or clutch. The drive pulley is connected to the crankshaft of the engine. The driving pulley is also called the input pulley because it is where the energy from the engine enters the transmission. The second pulley is called the driven pulley because the first pulley turns it. As an output pulley, the driven pulley transfers energy to the driveshaft of the track drive. Each pulley is composed of a fixed sheave or pulley half that is fixed in the axial direction, and a movable sheave or pulley half, which is movable in the axial direction. A high strength metal or rubber belt, such as a V-belt, joins the drive pulley and the driven pulley and rides in the groove between the two sheaves. When the two sheaves of the pulley are far apart, the belt rides lower in the groove, and the radius of the belt loop going around the pulley gets smaller. When the sheaves are close together, the belt rides higher in the groove, and the radius of the belt loop going around the pulley gets larger.

Thus, the effective radius of both the primary and the secondary pulley is variable. The ratio of the primary pulley radius to the secondary pulley radius determines the ratio of engine rotational speed to the secondary shaft rate of rotation. When the primary clutch radius is smaller than the secondary clutch radius, the secondary shaft turns at a rate that is slower than the engine speed, resulting in a relatively low vehicle speed. As the ratio of the primary and the secondary clutch radius approaches 1:1, the secondary shaft speed will be approximately equal to the engine or crankshaft speed. As the primary pulley radius becomes greater than the radius of the secondary clutch, an overdrive condition exists in which the secondary shaft turns at a greater rate than the engine crankshaft. CVT's may use hydraulic pressure, centrifugal force or spring pressure to create the force necessary to adjust the pulley halves.

When one pulley increases its radius, the other decreases its radius to keep the belt tight. As the two pulleys change their radii relative to one another, they create an infinite number of gear ratios—from low to high and everything in between. For example, when the pitch radius is small on the driving pulley and large on the driven pulley, then the rotational speed of the driven pulley decreases, resulting in a lower gear. When the pitch radius is large on the driving pulley and small on the driven pulley, then the rotational speed of the driven pulley increases, resulting in a higher gear. Thus, in theory, a CVT has an infinite number of gears through which it can run at any time, at any engine speed or at any vehicle speed.

These variable transmissions are equipped with a speed or revolution per minute (RPM) responsive mechanism associated with the drive pulley and a torque responsive mechanism associated with the driven pulley. Therefore, the drive pulley and the driven pulley continuously vary the shift ratio in relation to the drive speed and the driven torque.

The primary clutch is connected to the power source and in theory has the job of maintaining the engine's RPM at a value where the most power is being produced by the engine. The primary clutch may also control engagement and disengagement of the engine from the load in order to stop and start vehicle movement. In the case of a snowmobile, the secondary or driven clutch is connected to the load through a jackshaft, gears, chain and track and functions to change the ratio of the two clutches as the load varies. This function is performed by a torque sensing helix or the like, which is typically considered part of the secondary clutch.

Prior art clutches are typically of the cam arm and roller type or comprises a sliding block. The cam arm and roller type clutches are prone to premature wear of the cam arm and the roller, which results in earlier and more frequent replacement. The calibration of force on the belt can also produce excessive belt heat, which results in belt failure.

With respect to the sliding block type of clutch, these types of clutches have calibration characteristics that prevent the clutch from producing desired performance. As both types of clutches used today have varying functional limitations, calibrating a clutch for desired performance often results in undesired inherited clutch characteristics.

Drive clutch systems of the prior art lack durability due to wear and tear caused by radial movement from the engine. Engines develop instantaneous RPM changes during operation and produce torsional vibration and varying inputs. Radial movement, which for purposes of this disclosure, comprises torsional vibration, instantaneous RPM and varying input, causes roller wear and surface deterioration of the cam arms as the result of the arms moving across the direction of support of the cam arm bearing and the roller bearing. Prior art methods of minimizing this wear including improving machining tolerance, precision improvements to assembly practices and using higher quality material, all of which increase the costs associated with the clutch device.

SUMMARY OF THE INVENTION

An aspect of the present disclosure relates to a drive clutch having a torque transfer mechanism between the engine and the moveable sheave configured to reduce wear on components of the drive clutch by eliminating the sliding contact between a moveable sheave and a drive shaft member. The torque transfer mechanism for increasing efficiency and reducing wear may comprise a torque bellows, which is configured to more efficiently transfer torque from the engine to the moveable sheave upon radial compression of the torque bellows, by being attached to the stationary shaft and the moveable sheave through a cover. Sliding blocks and corresponding slide tracks are concentrically positioned between the moveable sheave and the shift plate and centrifugal force provides a force for linear movement for the sliding blocks, which results in axial movement of the moveable sheave, which can act to compress the torque bellows and to move the moveable sheave axially as well as radially. This configuration reduces costs because precise machining is not needed and reduces premature wear and tear on the drive clutch.

Another aspect of the present disclosure relates to monitoring and controlling the pressure of a fluid or air sealed in a cavity between the cover and the torque bellows. The torque bellows may be sealed to the cover by a sealing mechanism and the torque bellows is axially compressible along a shaft of the drive clutch. The cavity formed by the shape of the torque bellows may be filled with fluid or air. Compression of the torque bellows, resulting from axial movement of the drive clutch components during operating, thus changes the fluid or air pressure within the cavity. When the cavity is filled with a fluid or air and sealed, the pressure can be gauged and monitored and changes to pressure and volume can be made to adjust functional parameters of the drive clutch.

DETAILED DESCRIPTION OF ILLUSTRATIVE EMBODIMENTS

The present disclosure is directed to a clutch assembly for belt-type continuously variable transmissions (CVT) which are used in relatively small motorized vehicles, such as snowmobiles, all-terrain vehicles (ATV's), tractors, motor scooters, go-carts and golf carts. The clutch assembly of the present disclosure is configured to more effectively transfer torque from an engine to a moveable sheave of the clutch assembly. In one embodiment of the present disclosure, the clutch assembly incorporates a torque bellows. The torque bellows is compressible and compression of the torque bellows results from the transfer of torque from the engine to the moveable sheave. This disclosure is further directed to a method of controlling the forces generated by shift blocks by incorporating a control mechanism. The control mechanism may comprise a control device such as a modulator. It is further contemplated that an interface of the control device can be operable with various smart systems (electronics) of the engine and motorized vehicles including other electronic devices.

Figure 1:
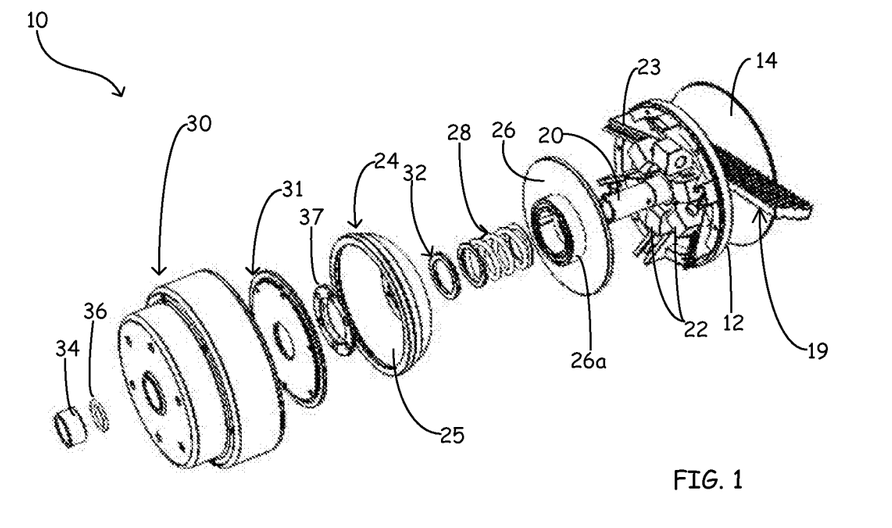
FIG. 1 is an exploded view of a drive clutch according to the present disclosure.

FIG. 1 is an exploded view of an embodiment of the drive clutch 10 of the present disclosure. In one example of the clutch 10, a shaft 20 carries a frusto-conical movable sheave 12 and a frusto-conical axially fixed sheave 14. Movable sheave 12 includes a belt surface 16 and the fixed sheave 14 includes belt surface 18. A V-belt 19 rides between belt surfaces 16, 18. During operation of a snowmobile or other vehicle, as power is applied to the engine, throw weights or sliding blocks 22, which are integral to the drive clutch 10 act to squeeze the sheaves 12, 14 toward each other. The squeezing of the sheaves 12, 14 of the drive clutch 10 in turn move the V-belt outwardly toward the exterior circumference of the sheaves 12, 14 of the drive clutch 10. The movement of the V-belt 19 outwardly relative to the drive clutch 10 sheaves 12, 14 in turn causes the V-belt 19 to be drawn inwardly relative to the sheaves of the driven or secondary clutch. The sheaves of the driven or secondary clutch then separate. The separation of the driven sheaves in turn changes a gear ratio of the snowmobile.

The following description is in particular to the operation of drive clutch 10, which is mounted to the engine by shaft 20. The taper of the shaft 20 corresponds to the engine's taper shape and transmits engine power to the clutch 10. As the engine RPM increases, sliding blocks 22 are incorporated to produce the force against the shift plate 26. The amount of force required to produce shifting action is tuned or calibrated to be exact, however embodiments of the present disclosure produces additional force, or a force greater than is required for shifting. This force is resisted which allows a control device, for example, a modulator, to be used to produce the selected shifting action as will be discussed further below.

This force overcomes the resistance of a return spring 28 and applies an axial force that moves the movable sheave 12 against the drive belt, which rides between belt surfaces 16 and 18, toward fixed sheave 14 and starts the shift function. Thus, torque is transferred from the engine to the shaft 20 such that the torque transfer path is through the shaft 20, to the shift plate 26, to the torque bellows 24, to the cover 31, and back to the movable sheave 12. The force applied to the belt is generated by the shift blocks 22 which slide between inclined shift ramps 23 and the shift plate 20, where the return spring 28 acts against this applied force. Spring resistance sets the engagement force and RPM. The spring 28 also generates a subtractive force on the belt. Typically, the force needed for a required shift pattern is a balance of the weight of the cam arm or shift block and the spring. Embodiments of the present disclosure can advantageously utilize this force when the torque bellows 24 is attached to the sheave 12 and the torque bellows is unsealed, that is in embodiments where no o-ring 32 is present to seal the connection of torque bellows 24 to the shaft 20 extending through the aperture and along which the torque bellows is axially compressible.

The shaft 20 supports the torque bellows 24, which is a torque transfer mechanism and may be positioned such that a cover plate 31 may be positioned to selectively seal off an open space or internal cavity 25 of the torque bellows 24. Alternatively, the torque bellows may remain unsealed. The cover plate 31 may comprise, for example, a metal material or a manufactured plastic material. Further, a spring 28 may be positioned on the shaft 20 between the shift plate 26 and the torque bellows 24 for a counter force for compressing the torque bellows 24.

Figure 2:
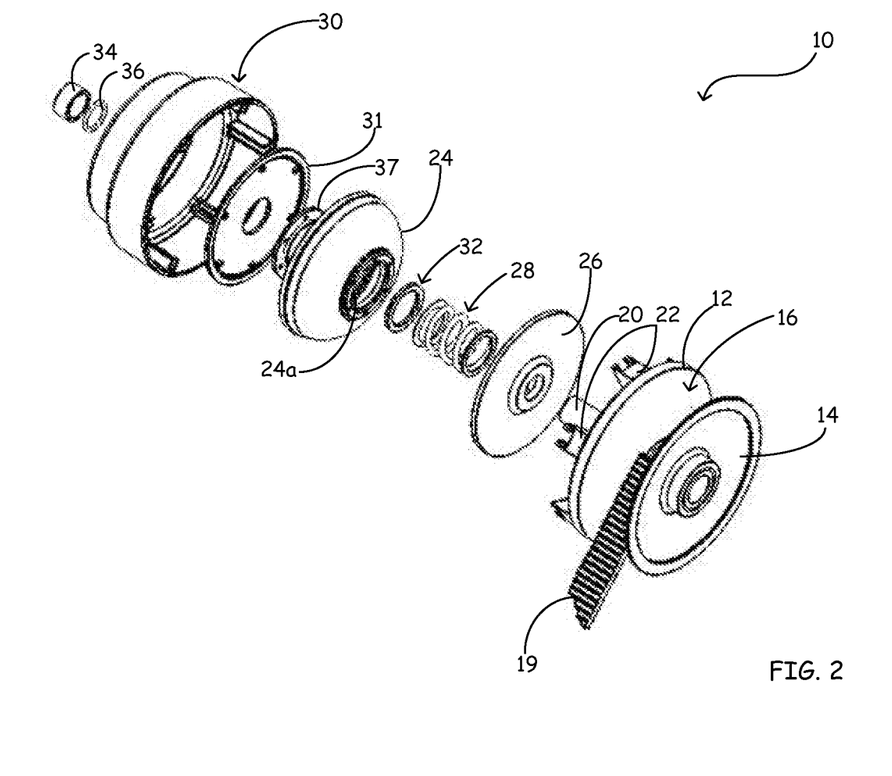
FIG. 2 is an alternative exploded view of the drive clutch.
Figure 3:
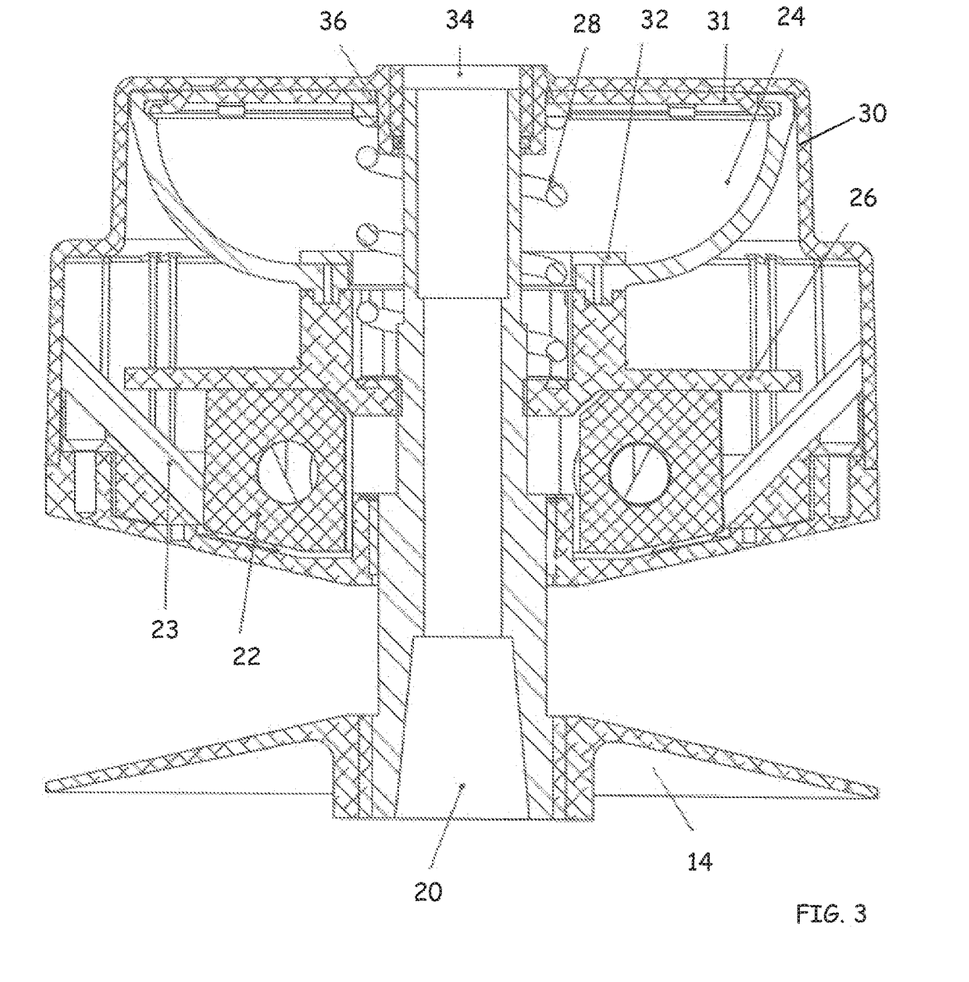
FIG. 3 is a cross-sectional side-view of the drive clutch assembled.
Figure 4:
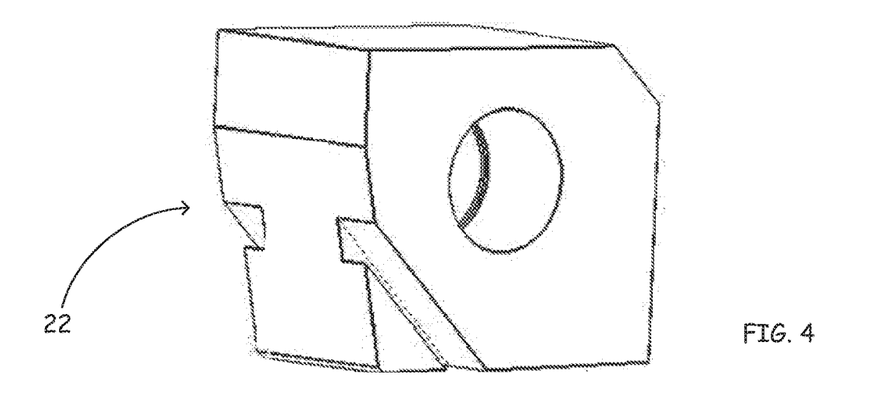
FIG. 4 is side perspective view of a slide block of the drive clutch.
Figure 5A:
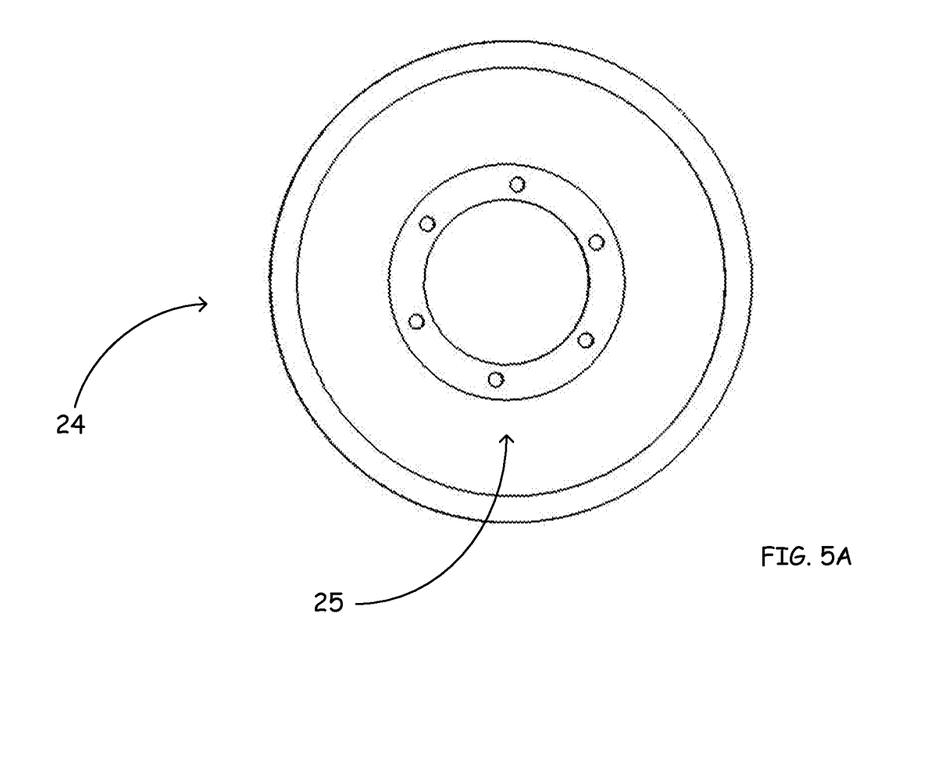
FIG. 5A is a bottom view of a torque bellows of the drive clutch.
Figure 5B:
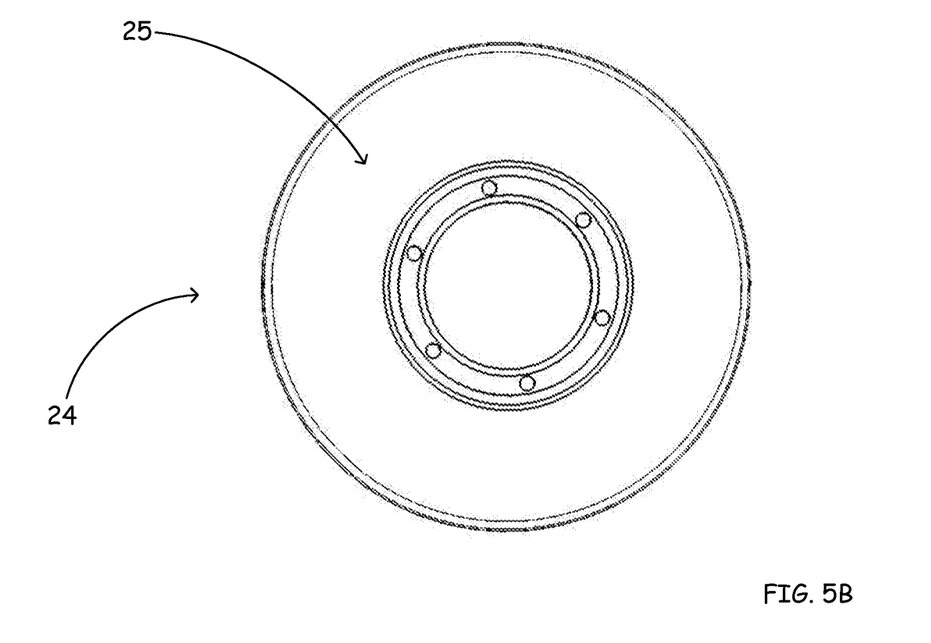
FIG. 5B is a top view of the torque bellows of the drive clutch.
Figure 5C:
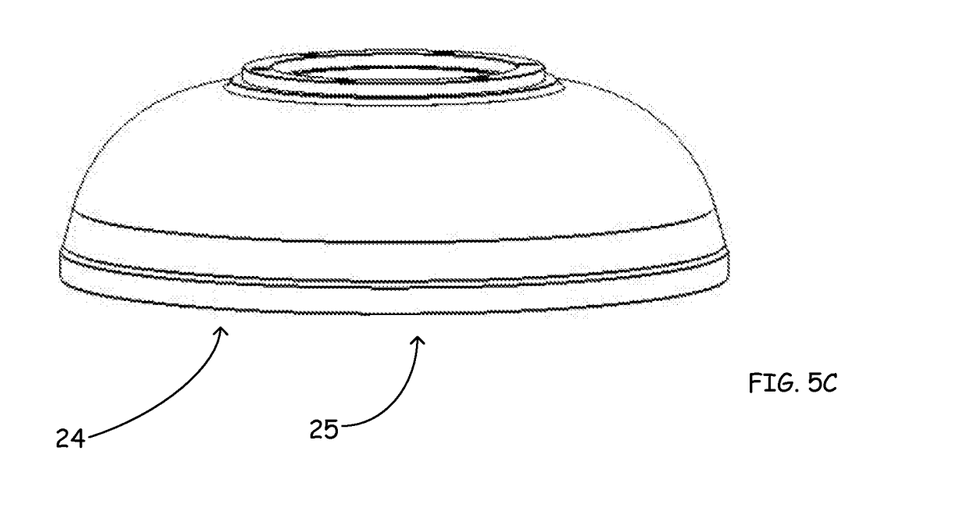
FIG. 5C is a side perspective view of the torque bellows of the drive clutch.
Figure 5D:
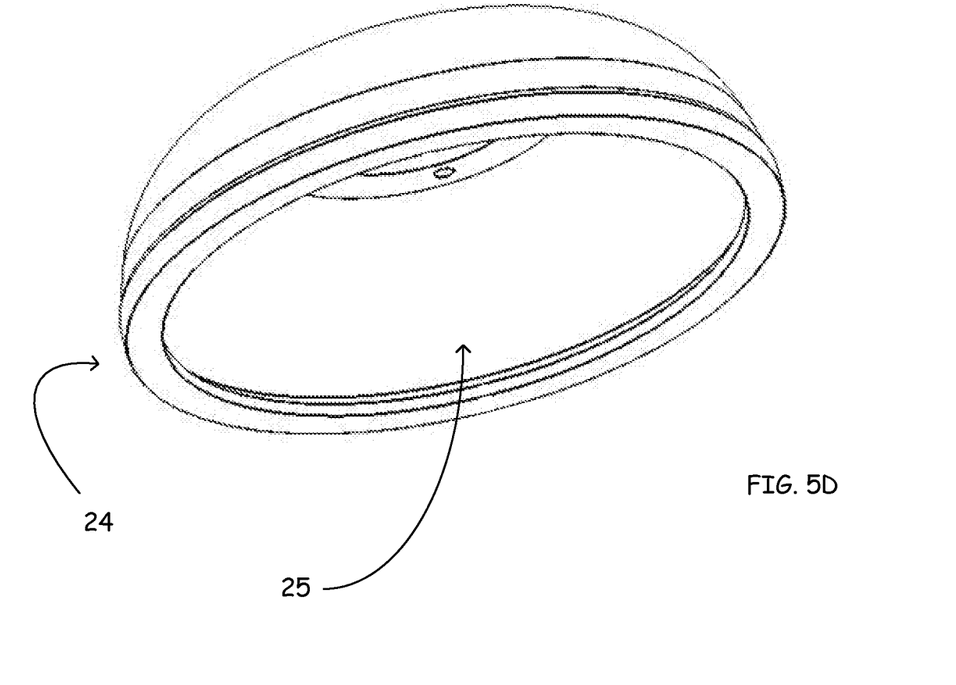
FIG. 5D is a bottom perspective view of the torque bellows of the drive clutch.
Figure 6A:
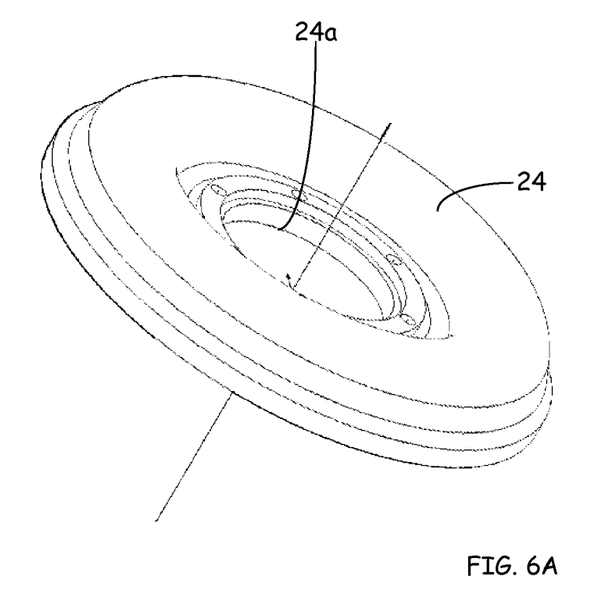
FIG. 6A-B are perspective views of the torque bellows when compressed.
Figure 6B:
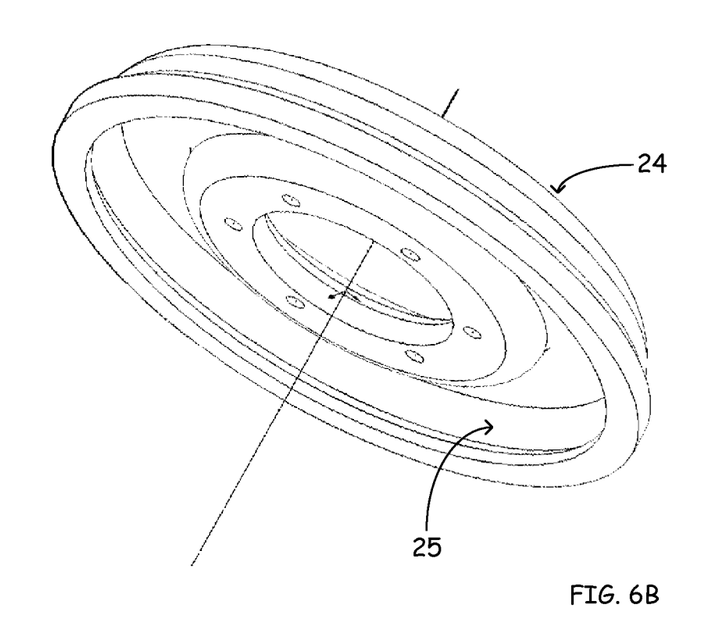

As illustrated in FIGS. 1-2, the torque bellows 24 is positioned on the shaft between the shift plate 26 and cover plate 31. A clamp 37 is positioned between the cover plate 31 and the torque bellows 24 to clamp the torque bellows 24 to the shift plate 26, which is secured in the drive clutch around the shaft 20. The clamp 37, which may be for example, a washer, is configured to engage with the shift plate 26 at collar 26a and the spring 28 is positioned within this collar 26a and in connection with the torque bellows 24. Spacer 32 may or may not be incorporated into the drive clutch 10, however as illustrated, spacer 32 is configured to allow for adjustment of the load of the spring 28, which sets an engagement point. The torque bellows 24 is attached to the sheave 12 in a manner that allows the parts to be radially movable. For example, the torque bellows 24 has an aperture 24a generally centered in the concave outer surface near allowing the torque bellows 24 to be secured around the shaft 20.

Thus, the torque bellows 24 is configured to more effectively transfer torque from the engine to the movable sheave 12 and is a component that is flexible in an axial direction while being rigid in a radial direction. The torque bellows 24 is compressed as a result of torque transfer and this compression can be externally modulated. The torque bellows 24 and spring 28 may each change the pressure and volume within the cavity 25 and thus change the effect of the spring rate. For example, the sealed torque bellows 24 has a volume and pressure that can be adjusted by a controller or the modulator, and this adjustment allows the spring rate to be adjusted by, for example, 50 lbs.

In the embodiment illustrated and as shown in FIGS. 5A to 6B, the torque bellows 24 is a concave component having an outer diameter substantially equal to or slightly less than the diameter of the cover 31. While embodiments of the present disclosure illustrate the torque bellows 24, other designs that effectively transfer torque while eliminating the surface contact between the moveable sheave 12 and the shift plate 20 can be incorporated. The torque bellows 24 is generally "bowl shaped" and comprises a resilient material that allows the torque bellow to be axially compressible and radially fixed. In the embodiment illustrated, the torque bellows 24 is comprised of rubber which allows the bellows to be sufficiently sturdy and to withstand internal pressure changes in the concave area when sealed and remain resilient when pressure is applied to compress the torque bellow and released to allow the torque bellows 24 to return to its standard shape.

The movable sheave 12 is axially moveable and is moveable against the return spring 28 in one direction. This movement results in compression of the torque bellows 24 in one direction. An outer side or surface of the torque bellows 24 is attached to the cover 31, which acts to selectively seal torque bellow cavity 25 and this plate 31 may also act as a clamping mechanism. The drive clutch 10 may operate with a sealed cavity 25 or an unsealed cavity 25.

As illustrated in the figures, the cavity 25, which is an inner area or concave part of torque bellows 24 may be sealed or unsealed. The volume of the cavity 25 is changed as the torque bellows 24 is compressed. When unsealed, the torque bellows 24 operates to balance the force of weights, which move the moveable sheave, with the spring force at the same time torque is transferred from the engine to the movable sheave. When sealed, the volume and pressure inside the cavity 25 can be externally modulated.

As the torque bellows 24 and the cover 31 may be positioned to seal the cavity 25, forming an interior area where pressure can be adjusted by connection to an external source of pressure or a relief valve for controlling the pressure in the interior are. Altering this pressuring causes the shift pattern to be selectively changed as a function of the control mechanism. For example, the pressure can be varied by engine vacuum and modulated by the electronic controls of the engine.

The return spring 28 configuration is a steel compression spring in contact with the torque bellows 24 at or near aperture 24a. The return spring 28 aids with external modulation of the shift rate and as the torque bellows 24 is compressed and the spring force is resisted, the volume of the torque bellows can be modulated. For example, introducing a vacuum effectively decreases the spring force in a sealed cavity 25. The modulation may be generated by increasing or decreasing the pressure within the torque bellows 24 by means of air or fluid, where for example, the volume can be changed within the interior 25. A valve may be provided to control internal pressure. An example of a suitable valve is a solenoid whose operation is controlled by the electronic control unit (or "ECU") of the engine. This control unit may, in some examples, comprise a modulator. Another electrical method of modulation uses a piezoelectric device embedded on the surface of the torque bellows 24.

The torque produced by the engine is transmitted to the moveable sheave 12, however the torque bellows 24 and spring 28, which compress and decompress when the moveable sheave 12 is displaced by outward and inward movement of weights or sliding blocks as discussed further below, the torque transfer mechanism allows for more efficient torque transfer from the engine to the moveable sheave and a reduction in wear and tear on the drive clutch parts. The assembly reduces the contacting of sliding radial surfaces, which allows for a reduction in clutch failures and in clutch function related to slip and stick malfunctions. As the torque bellows eliminates this sliding contact between two surfaces to transfer torque, the associated effects of radial movement between the sliding surfaces are reduced or eliminated. The drive clutch is further configured with the torque bellows such that torsional vibrations due to instantaneous RPM changes during operation and the noise associated therewith are reduced.

In further detail, sliding blocks 22 and outwardly inclined surfaces provide a track or ramp 23 for each sliding block and limiting the distance the sliding blocks can move outwardly and inwardly with respect to the shaft 20 are incorporated. Such a configuration is only a single representative embodiment of the invention. In alternative embodiments, cam arm and cam ball assemblies may be used or other methods of distributing the force can be incorporated. An odd number of sliding blocks may be used to contribute to rotational stability. A concentric and evenly spaced arrangement of sliding blocks 22 around the shaft 20 allows balance and efficiency to be maintained within the drive clutch 10 assembly. In prior art drive clutches, torsional vibrations exist when in operation and effect the rollers and the cam arm. These vibrations cause cam arm wear and failure. Embodiments of the present disclosure may incorporate the sliding blocks 22 and corresponding ramps 23 for sliding block centrifugal movement which allows the relative movement of the components as shifting is accomplished with these sliding blocks acting against a surface with no index preference.

As discussed previously above, the force moves the sheave 12, moving the movable sheave 12 with respect to the stationary sheave 14, the clutch begins shifting and the torque bellows 24 is axially compressed or collapsed. When the torque bellows 24 is sealed, the fluid or air in the cavity 25 of the torque bellows 24 will also compress and the pressure will be increased in concave area 25 of the torque bellows 24 as sealed against the cover plate 31. This pressure can be gauged with for example, a pressure sensor (not shown) in communication with the control device or modulator by a flexible hose connection which also allows for fluid or air volume control. The modulator can be configured to change the volume of the liquid and/or the pressure in the torque bellows in response to readings from the sensor. Changing the volume allows the rate of the shift pattern to be selectively changed and changing the pressure in the torque bellows 24 allows the operating RPM of the engine to be changed. When an electric motor or similar device is attached to the modulator, the modulator can be controlled electronically.

An outer cover 30 encloses the drive clutch and covers the torque bellows 24 and interior parts up to the movable shave by being configured to slide over and around the drive clutch components positioned on the shaft 20. The cover 30 is positioned such that bolts or another securing mechanism may be utilized to secure the cover 30 to the moveable sheave which may include a cover bushing 34 and can be used to seal of and enclose the drive clutch by including seals 36 on the ends, such as o-rings.

Although the present invention has been described with reference to preferred embodiments, workers skilled in the art will recognize that changes may be made in form and detail without departing from the spirit and scope of the invention.

What is claimed:

1. A method of efficiently transferring torque for shifting at least one gear with a drive clutch mechanism, the method comprising:
   providing a drive clutch assembly comprising an axially compressible torque transfer mechanism;
   applying torque to a shaft component of the drive clutch and connected to the torque transfer mechanism by running a motor operably connected to the drive clutch;
   initiating shifting of a gear of the drive clutch;
   axially compressing and radially loading the torque transfer mechanism to transfer torque from the engine to a moveable sheave of the drive clutch wherein transferring torque is along a torque transfer path through the shaft component, to a shift plate, to a compressible housing having an open interior, to a cover therefor, and back to the movable sheave.

2. The method of claim 1, wherein the compressible housing of the torque transfer mechanism comprises a substantially semi-spherical housing having a substantially open interior providing an open space and a substantially flat cover configured to be securely attached to an open end of the semi-spherical housing and to seal off the open space.

3. The method of claim 2, and providing a cover for the torque transfer mechanism configured to selectively seal an interior cavity of the torque transfer mechanism.

4. The method of claim 3, and further comprising selectively adjusting positive or negative pressure within the sealed off interior cavity of the torque transfer mechanism for selectively controlling drive clutch performance.

* * * * *